US010542410B2

(12) United States Patent
Lee et al.

(10) Patent No.: US 10,542,410 B2
(45) Date of Patent: Jan. 21, 2020

(54) METHOD AND DEVICE FOR EXCHANGING CONNECTION CAPABILITY INFORMATION IN WIRELESS COMMUNICATION SYSTEM

(71) Applicant: LG ELECTRONICS INC., Seoul (KR)

(72) Inventors: Byungjoo Lee, Seoul (KR); Dongcheol Kim, Seoul (KR); Giwon Park, Seoul (KR); Youngjun Jo, Seoul (KR); Taesung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/757,331

(22) PCT Filed: Sep. 2, 2016

(86) PCT No.: PCT/KR2016/009835
§ 371 (c)(1),
(2) Date: Mar. 2, 2018

(87) PCT Pub. No.: WO2017/039376
PCT Pub. Date: Mar. 9, 2017

(65) Prior Publication Data
US 2018/0242135 A1     Aug. 23, 2018

Related U.S. Application Data

(60) Provisional application No. 62/213,549, filed on Sep. 2, 2015, provisional application No. 62/213,635, filed (Continued)

(51) Int. Cl.
*H04W 8/08*     (2009.01)
*H04W 8/00*     (2009.01)
(Continued)

(52) U.S. Cl.
CPC ............. *H04W 8/005* (2013.01); *H04W 4/80* (2018.02); *H04W 8/00* (2013.01); *H04W 76/10* (2018.02);
(Continued)

(58) Field of Classification Search
CPC ....... H04W 8/005; H04W 76/14; H04W 4/80; H04W 76/10; H04W 8/00; H04W 80/10; H04W 92/18
See application file for complete search history.

(56) References Cited

U.S. PATENT DOCUMENTS

2014/0334464 A1    11/2014   Qi et al.
2014/0351445 A1*   11/2014   Davidson ............... H04W 8/005
                                                          709/227
2015/0172905 A1*    6/2015   Qi .......................... H04W 8/005
                                                          370/338

FOREIGN PATENT DOCUMENTS

WO       2014/106990       7/2014
WO       2014123382        8/2014
(Continued)

OTHER PUBLICATIONS

PCT International Application No. PCT/KR2016/009835, Written Opinion of the International Searching Authority dated Dec. 5, 2016, 19 pages.
(Continued)

*Primary Examiner* — Edward F Urban
*Assistant Examiner* — Angelica M Perez
(74) *Attorney, Agent, or Firm* — Lee, Hong, Degerman, Kang & Waimey

(57) ABSTRACT

A method is provided for a first terminal performing connection capability exchange in a wireless communication system. The method includes transmitting, to a second terminal, a P2P probe request frame for a service discovery, receiving, from the second terminal, a P2P probe response
(Continued)

frame for the service discovery, establishing of a connection with the second terminal and forming an ASP session with the second terminal. The P2P probe request frame and the P2P probe response frame include connection capability exchange information and establishing the connection is performed based on the connection capability exchange information.

17 Claims, 12 Drawing Sheets

Related U.S. Application Data on Sep. 3, 2015, provisional application No. 62/238,162, filed on Oct. 7, 2015.

(51) Int. Cl.
*H04W 76/10* (2018.01)
*H04W 80/10* (2009.01)
*H04W 92/18* (2009.01)
*H04W 76/14* (2018.01)
*H04W 4/80* (2018.01)

(52) U.S. Cl.
CPC .......... *H04W 76/14* (2018.02); *H04W 80/10* (2013.01); *H04W 92/18* (2013.01)

(56) References Cited

FOREIGN PATENT DOCUMENTS

| WO | 2014/186593 | 11/2014 |
| WO | 2015119665 | 8/2015 |

OTHER PUBLICATIONS

European patent application No. 16842342.4, European search report dated Dec. 21, 2018, 11 pages.

\* cited by examiner

METHOD AND DEVICE FOR EXCHANGING CONNECTION CAPABILITY INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2016/009835, filed on Sep. 2, 2016, which claims the benefit of U.S. Provisional Application No. 62/213,549, filed on Sep. 2, 2015, 62/213,635, filed on Sep. 3, 2015, and 62/238,162, filed on Oct. 7, 2015, the contents of which are all hereby incorporated by reference herein in their entirety.

TECHNICAL FIELD

The present invention relates to a wireless communication system, and more particularly, to a method and device for performing connection capability exchange (CCEX) in a wireless communication system.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable device such as a personal digital assistant (PDA), a laptop computer, a portable multimedia player (PMP), etc. based on a radio frequency technology.

A standard for a WLAN (wireless local area network) technology is developing by IEEE (institute of electrical and electronics engineers) 802.11 group. IEEE 802.11a and b use an unlicensed band on 2.4 GHz or 5 GHz, IEEE 802.11b provides transmission speed of 11 Mbps and IEEE 802.11a provides transmission speed of 54 Mbps. IEEE 802.11g provides transmission speed of 54 Mbps by applying OFDM (orthogonal frequency division multiplexing) on 2.4 GHz. IEEE 802.11n provides transmission speed of 300 Mbps by applying MIMO-OFDM (multiple input multiple output-orthogonal frequency division multiplexing). IEEE 802.11n supports a channel bandwidth up to 40 MHz. In this case, transmission speed can be provided as fast as 600 Mbps. IEEE 802.11p corresponds to a standard for supporting WAVE (wireless access in vehicular environments). For instance, 802.11p provides improvement necessary for supporting ITS (intelligent transportation systems). IEEE 802.11ai corresponds to a standard for supporting fast initial link setup of IEEE 802.11 station.

A DLS (direct link setup)-related protocol in wireless LAN environment according to IEEE 802.11e is used on the premise of a QBSS (quality BSS) supporting QoS (quality of service) supported by a BSS (basic service set). In the QBSS, not only a non-AP STA but also an AP corresponds to a QAP (quality AP) supporting QoS. Yet, in current commercialized wireless LAN environment (e.g., wireless LAN environment according to IEEE 802.11a/b/g etc.), although a non-AP STA corresponds to a QSTA (quality STA) supporting QoS, most of APs corresponds to a legacy AP incapable of supporting QoS. Consequently, in the current commercialized wireless LAN environment, there is a limit in that a QSTA is unable to use a DLS service.

In a recent situation that such a wireless short-range communication technology as Wi-Fi and the like is widely applied to a market, connection between devices is performed not only based on a local network but also based on direct connection between devices. One of technologies enabling devices to be directly connected is Wi-Fi Direct.

Wi-Fi Direct corresponds to a network connectivity standard technology describing up to operations of a link layer. Since there is no definition on a regulation or a standard for an application of a higher layer, it is difficult to have compatibility and consistency of an operation after Wi-Fi Direct devices are connected with each other. For this reason, such a standard technology including higher layer application technology as WFDS (Wi-Fi Direct service) is under discussion by WFA (Wi-Fi alliance).

The WFA has announced such a new standard for delivering data via a direct connection between mobile devices as Wi-Fi Direct. Hence, related industries are actively developing a technology for satisfying the Wi-Fi Direct standard. In a strict sense, the Wi-Fi Direct is a marketing terminology and corresponds to a brand name. A technology standard for the Wi-Fi Direct is commonly called Wi-Fi P2P (peer to peer). Hence, the present invention describing Wi-Fi-based P2P technology may be able to use Wi-Fi Direct and Wi-Fi P2P without any distinction. In a legacy Wi-Fi network, a user accesses the legacy Wi-Fi network via an AP (access point) and accesses the Internet to use a device on which Wi-Fi is mounted. A data communication method via direct connection between devices is also used in a legacy communication by some users in a manner of being mounted on a device (e.g., a cellular phone, a note PC, etc.) on which a wireless communication technology such as Bluetooth is mounted. Yet, according to the data communication method, transmission speed is slow and transmission distance is limited to within 10 m. In particular, when the data communication method is used for transmitting massive data or is used in environment at which many Bluetooth devices exist, there exists a technical limit in performance capable of being felt by a user.

Meanwhile, Wi-Fi P2P maintains most of functions of the legacy Wi-Fi standard and includes an additional part for supporting direct communication between devices. Hence, the Wi-Fi P2P can sufficiently utilize hardware and physical characteristics of a device on which a Wi-Fi chip is mounted and is able to provide device-to-device P2P communication by upgrading a software function only.

As widely known, the device on which the Wi-Fi chip is mounted is extending to various ranges including a note PC, a smartphone, a smart TV, a game console, a camera and the like. For the device, sufficient numbers of suppliers and technology development personnel have been formed. Yet, software development supporting the Wi-Fi P2P standard is not vitalized yet. This is because, although a Wi-Fi P2P standard is announced, related software capable of conveniently using the Wi-Fi P2P standard is not distributed.

There exists a device playing a role of an AP in a legacy infrastructure network in a P2P group. The device is called a P2P group owner (GO) in a P2P standard. Various P2P clients may exist on the basis of the P2P GO. One GO exists in a single P2P group only and all remaining devices become client devices.

Recently, the use of Bluetooth, NAN (neighboring awareness networking), and NFC (near field communication) is increasing. Hence, it is necessary to have a method of providing a service in environment in which a plurality of systems or interfaces are provided.

DISCLOSURE

Technical Problem

The present specification relates to a method and device for performing connection capability exchange in a wireless communication system.

An object of the present specification is to provide a method for performing connection capability exchange when a method for connecting a plurality of services based on an ASP (Application Service Platform), which supports a plurality of interfaces, is supported in a wireless communication system.

Another object of the present specification is to provide a method for performing connection capability exchange through service discovery.

Other object of the present specification is to provide a method for reducing unnecessary procedures of a user equipment in a wireless communication system.

Technical Solution

In accordance with one embodiment of the present specification, a method for performing connection capability exchange in a first UE of a wireless communication system may be provided. In this case, the method comprises the steps of transmitting, to a second UE, a P2P probe request frame for a service discovery; receiving, from the second UE, a P2P probe response frame for the service discovery; performing connection establishment with the second UE; and establishing an application service platform (ASP) session with the second UE, wherein the P2P probe request frame and the P2P probe response frame include connection capability exchange (CCEX) information, and the connection establishment is performed on the basis of the connection capability exchange information.

In accordance with another embodiment of the present specification, a first UE for performing connection capability exchange (CCEX) in a wireless communication system may be provided. In this case, the first UE comprises a reception module for receiving information from an external device; a transmission module for transmitting information to the external device; and a processor for controlling the reception module and the transmission module. The processor may transmit, to a second UE, a P2P probe request frame for a service discovery by using the transmission module, receive, from the second UE, a P2P probe response frame for the service discovery, perform connection establishment with the second UE and form an application service platform (ASP) session with the second UE. The P2P probe request frame and the P2P probe response frame may include connection capability exchange (CCEX) information, and the connection establishment may be performed on the basis of the connection capability exchange information.

Also, the followings may commonly be applied to the method and device for performing connection capability exchange in the first UE of the wireless communication system.

In accordance with one embodiment of the present specification, the first UE and the second UE may perform the service discovery on the basis of an ASP. In this case, the ASP may support a plurality of service discovery interfaces and a plurality of service connection interfaces.

At this time, in accordance with one embodiment of the present specification, the service discovery interface may be any one of Wi-Fi Direct, NAN, NFC, BLE and WLAN infrastructure.

Also, in accordance with one embodiment of the present specification, the first UE may transmit the P2P probe request frame to the second UE if the service discovery is performed based on the Wi-Fi Direct interface of the plurality of service discovery interfaces, and the service discovery may be completed if the first UE receives the P2P probe response frame from the second UE.

Also, in accordance with one embodiment of the present specification, the service connection interface may be any one of Wi-Fi Direct, NAN, and WLAN infrastructure.

At this time, in accordance with one embodiment of the present specification, the connection capability exchange information may include information as to whether the Wi-Fi Direct, the NAN, and the WLAN infrastructure can be supported.

Also, in accordance with one embodiment of the present specification, infrastructure connection information may further be included in the P2P probe request frame and the P2P probe response frame if the first UE is associated with an access point (AP).

Also, in accordance with one embodiment of the present specification, the infrastructure connection information may include BSSID information, and if BSSID of the infrastructure connection information included in the P2P probe request frame is matched with BSSID of the second UE, the first UE and the second UE may perform the connection establishment on the basis of WLAN infrastructure interface.

Advantageous Effects

The present specification may provide a method and device for performing connection capability exchange in a wireless communication system.

The present specification may provide a method for performing connection capability exchange when a method for connecting a plurality of services based on an ASP (Application Service Platform), which supports a plurality of interfaces, is supported in a wireless communication system.

The present specification may provide a method for performing connection capability exchange through service discovery.

The present specification may provide a method for reducing unnecessary procedures of a user equipment in a wireless communication system.

Effects obtainable from the present invention may be non-limited by the above mentioned effect. And, other unmentioned effects can be clearly understood from the following description by those having ordinary skill in the technical field to which the present invention pertains.

BEST MODE FOR CARRYING OUT THE INVENTION

Figure 1:
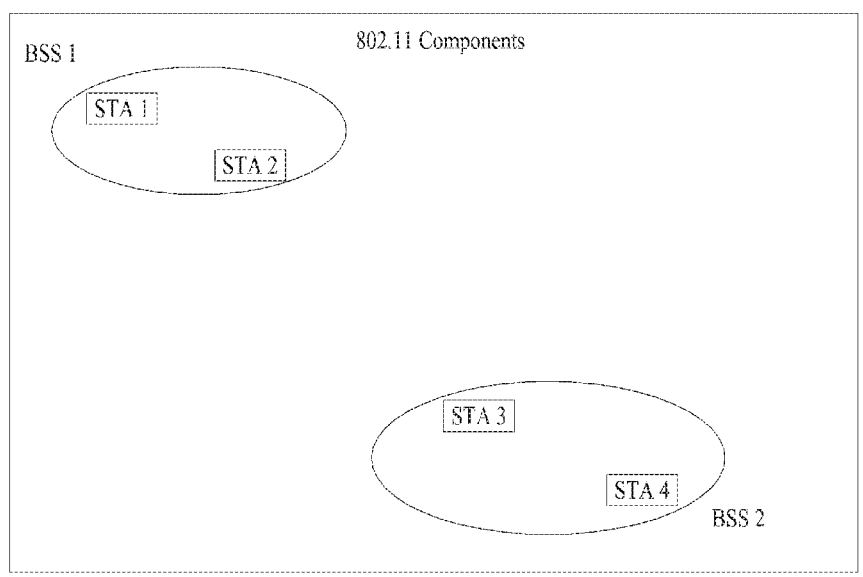
FIG. 1 is a diagram for an example of a structure of IEEE 802.11 system to which the present invention is applicable.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms " . . . unit", " . . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

FIG. 1 is a diagram for an example of a structure of IEEE 802.11 system to which the present invention is applicable.

IEEE 802.11 structure can consist of a plurality of configuration elements and a WLAN supporting mobility of an STA, which is transparent to an upper layer, can be provided by interaction of a plurality of the configuration elements. A basic service set (hereinafter abbreviated BSS) may correspond to a basic configuration block in IEEE 802.11 LAN. FIG. 1 shows an example that there exist two BSSs (BSS 1 and BSS 2) and two STAs are included in each of the BSSs as members, respectively (STA 1 and STA 2 are included in the BSS 1 and STA 3 and STA 4 are included in the BSS 2). In this case, an STA indicates a device operating according to MAC (medium access control)/PHY (physical) standard of IEEE 802.11. An STA includes an AP (access point) STA (simply, an AP) and a non-AP STA. An AP corresponds to a device providing network access (e.g., WLAN) to a non-AP STA via a wireless interface. The AP can be configured by a fixed form or a mobile form and includes a mobile wireless device (e.g., a laptop computer, a smartphone, etc.) providing a hot-spot. The AP corresponds to a base station (BS), a Node-B, an evolved Node-B (eNB), a base transceiver system (BTS), a femto BS and the like in a different wireless communication field. The non-AP STA corresponds to a device directly controlled by a user such as a laptop computer, a PDA, a wireless modem, a smartphone and the like. The non-AP STA can be called a terminal, a wireless transmit/receive unit (WTRU), a user equipment (UE), a mobile station (MS), a mobile terminal, a mobile subscriber station (MSS), and the like.

An oval indicating a BSS in FIG. 1 may be comprehended as a coverage area of the STAs included in the BSS to maintain a communication. This area can be called a basic service area (hereinafter abbreviated BSA). A BSS of a most basic type in IEEE 802.11 LAN may correspond to an independent BSS (hereinafter abbreviated IBSS). For instance, the IBSS may have a minimum form consisting of two STAs only. The BSS (BSS 1 or BSS 2), which is the simplest form and omitted different configuration elements, in FIG. 1 may correspond to a representative example of the IBSS. This sort of configuration is available when the STAs are able to directly communicate with each other. And, this kind of LAN can be configured when a LAN is necessary instead of being configured in advance. Hence, this network may be called an ad-hoc network.

When power of an STA is turned on or turned off or an STA enters into a BSS area or gets out of the BSS area, a membership of the STA in a BSS can be dynamically changed. In order to be a member of the BSS, the STA can join the BSS using a synchronization process. In order to access all services based on a BSS structure, the STA can be associated with the BSS.

Figure 2:
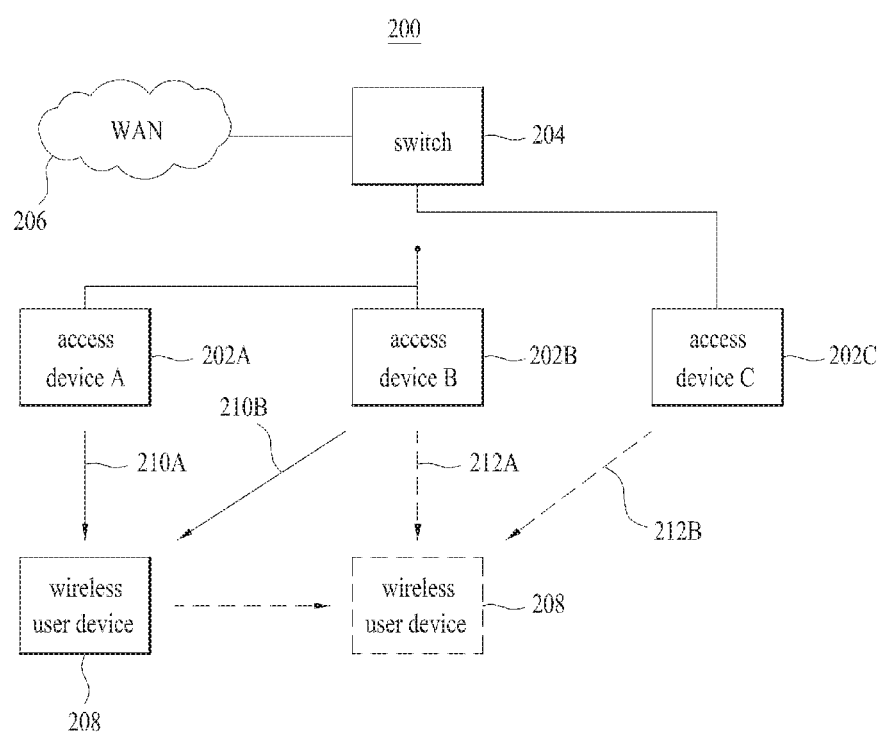
FIG. 2 is a block diagram for an example of operations of a communication system adopting access devices and wireless user devices.

FIG. 2 is a block diagram for an example of a communication system 200 adopting access devices (e.g., AP STAs) 220A/202B/202C and wireless user devices (e.g., non-AP STAs).

Referring to FIG. 2, access devices 202A to 202C are connected with a switch 204 providing access to a WAN (wide area network) 206 such as the Internet. Each of the access devices 202A to 202C provides wireless access to wireless devices belonging to a coverage area (not depicted) of the access device via a time division multiplexed network. Hence, the access devices 202A to 202C commonly provide a total WLAN coverage area of the system 200. For instance, a wireless device 208 may exist in a coverage area of the access devices 202A and 202B in a position represented by a box of a line. Hence, the wireless device 208 can receive beacons from each of the access devices 202A/202B as shown by line arrows 210A and 210B. If the wireless device 208 roams to a dotted line box from the line box, the wireless device 208 enters a coverage area of the access device 202C and leaves a coverage area of the access device 202A. Hence, as shown by dotted lines 212A and 212B, the wireless device 208 can receive beacons from the access devices 202B/202C.

When the wireless device 208 roams in the total WLAN coverage area provided by the system 200, the wireless device 208 can determine which device provides best access to the wireless device 208. For instance, the wireless device 208 repeatedly scans beacons of adjacent access devices and may be able to measure signal strength (e.g., power) related to each of the beacons. Hence, the wireless device 208 can be connected with an access device providing optimal network access based on maximum beacon signal strength. The wireless device 208 may be able to use a different reference related to optimal access. For instance, the optimal access may be associated with more preferable services (e.g., contents, data rate and the like).

Figure 3:
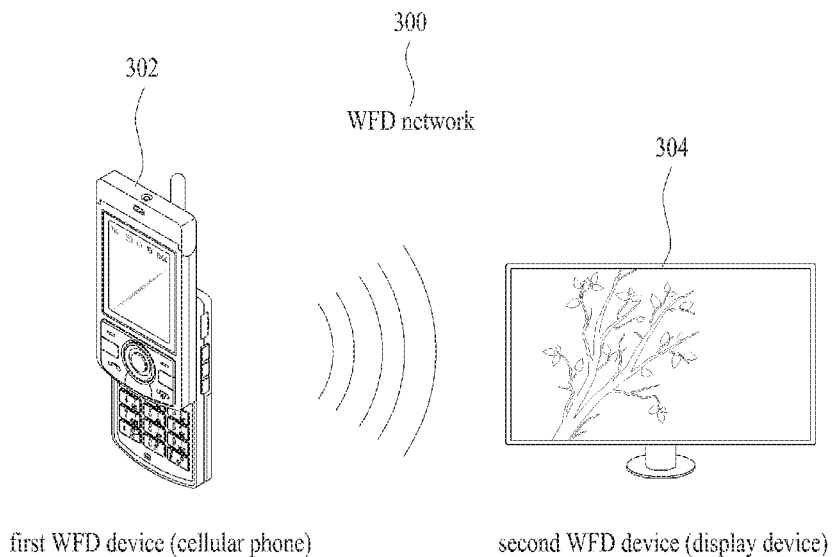
FIG. 3 is a diagram for an example of a WFD (Wi-Fi Direct) network.

FIG. 3 is a diagram for an example of a WFD (Wi-Fi Direct) network.

A WFD network corresponds to a network capable of performing D2D (device-to-device) (or peer to peer (P2P) communication although Wi-Fi devices do not participate in a home network, an office network or a hot-spot network. The WFD network is proposed by Wi-Fi alliance. In the following, WFD-based communication is called WFD D2D communication (simply, D2D communication) or WFD P2P communication (simply, P2P communication). And, a device performing the WFD P2P communication is called a WFD P2P device, simply, a P2P device.

Referring to FIG. 3, a WFD network 300 can include at least one or more Wi-Fi devices including a first WFD device 302 and a second WFD device 304. A WFD device includes devices supporting Wi-Fi such as a display device, a printer, a digital camera, a projector, a smartphone and the like. And, the WFD device includes a non-AP STA and an AP STA. Referring to an example shown in the drawing, the first WFD device 302 corresponds to a smartphone and the second WFD device 304 corresponds to a display device. WFD devices in the WFD network can be directly connected with each other. Specifically, P2P communication may correspond to a case that a signal transmission path between two WFD devices is directly configured between the WFD devices without passing through a third device (e.g., an AP) or a legacy network (e.g., access WLAN via an AP). In this case, the signal transmission path directly configured between the two WFD devices may be restricted to a data transmission path. For instance, P2P communication may correspond to a case that a plurality of non-STAs transmit data (e.g., audio/image/text message information etc.) without passing through an AP. A signal transmission path for control information (e.g., resource allocation information for P2P configuration, wireless device identification information and the like) can be directly configured between WFD devices (e.g., between a non-AP STA and a non-AP STA, between a non-AP STA and an AP), between two WFD devices (e.g., between a non-AP STA and a non-AP STA) via an AP or between an AP and a corresponding WFD device (e.g., an AP and a non-AP STA #1, between an AP and a non-AP STA #2).

Figure 4:
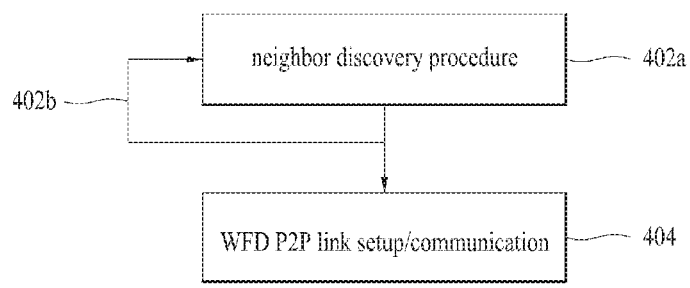
FIG. 4 is a flowchart for an example of a process of configuring a WFD network.

FIG. 4 is a flowchart for an example of a procedure of configuring a WFD network.

Referring to FIG. 4, a procedure of configuring a WFD network can be mainly divided into two procedures. A first procedure corresponds to a neighbor (device) discovery (ND) procedure [S402a] and a second procedure corresponds to a P2P link configuration and communication procedure [S404]. A WFD device (e.g., 302 in FIG. 3) finds out a different neighboring device (e.g., 304 in FIG. 3) in coverage (of the WFD device) via the neighbor discovery procedure and may be able to obtain information necessary for associating with the neighboring WFD device, e.g., information necessary for pre-association. In this case, the pre-association may indicate second layer pre-association in a wireless protocol. The information necessary for the pre-association can include identification information on the neighboring WFD device for example. The neighbor discovery procedure can be performed according to an available radio channel [S402b]. Subsequently, the WFD device 302 can perform a WFD P2P link configuration/communication procedure with the different WFD device 304. For instance, the WFD device 302 can determine whether the WFD device 304 corresponds to a WFD device not satisfying a service requirement of a user after the WFD device 302 is connected with the neighboring WFD device 304. To this end, the WFD device 302 is second layer pre-associated with the neighboring WFD device 304 and may be then able to search for the WFD device 304. If the WFD device 304 does not satisfy the service requirement of the user, the WFD device 302 disconnects the second layer connection established with the WFD device 304 and may be able to establish the second layer connection with a different WFD device. On the contrary, if the WFD device 304 satisfies the service requirement of the user, the two WFD devices 302/304 can transceive a signal with each other via a P2P link.

Figure 5:
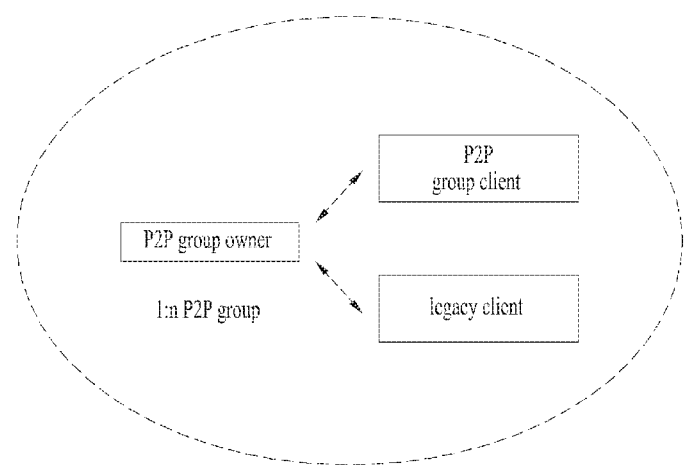
FIG. 5 is a diagram for a typical P2P network topology.

FIG. 5 is a diagram for a typical P2P network topology.

As shown in FIG. 5, a P2P GO can be directly connected with a client including a P2P function. Or, the P2P GO can be connected with a legacy client, which has no P2P function.

Figure 6:
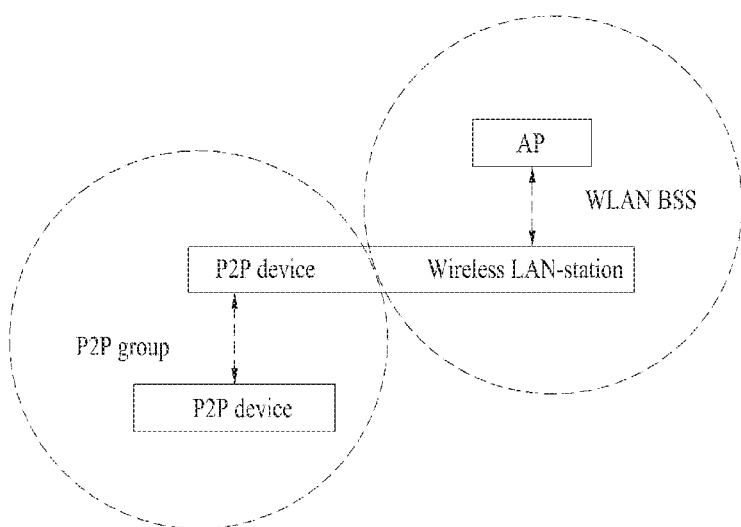
FIG. 6 is a diagram for a situation that a single P2P device forms a P2P group and is connected with an AP in a manner of operating as an STA of WLAN at the same time.

FIG. 6 is a diagram for a situation that a single P2P device forms a P2P group and is connected with an AP in a manner of operating as an STA of WLAN at the same time.

As shown in FIG. 6, according to P2P technical standard, a situation that a P2P device operates in the aforementioned mode is defined as a concurrent operation.

In order for a series of P2P devices to form a group, a P2P GO is determined based on a group owner intent value of a P2P attribute ID. The group owner intent value may have a value ranging from 0 to 15. P2P devices are exchanging the values and a P2P device including a highest value becomes the P2P GO. Meanwhile, in case of a legacy device not supporting the Wi-Fi P2P technology, although the legacy device can belong to a P2P group, a function of the legacy device is limited to a function of accessing an infrastructure network via the P2P GO.

According to Wi-Fi P2P standard, since a P2P GO transmits a beacon signal using OFDM (orthogonal frequency division multiplexing), a P2P device does not support 11b standard. Instead, 11a/g/n can be used as Wi-Fi P2P device.

In order to perform an operation of connecting a P2P GO and a P2P client with each other, a P2P standard mainly includes 4 functions described in the following.

First of all, P2P discovery is dealing with such a description entry as device discovery, service discovery, group formation and P2P invitation. According to the device discovery, 2 P2P devices exchange device-related information such as a device name of a counterpart device or a device type with each other via an identical channel. According to the service discovery, a service to be used and service-related information are exchanged with each other via P2P. According to the group formation, it corresponds to a function that a device to be a P2P GO is determined and a new group is formed. According to the P2P invitation, it corresponds to a function that a permanently formed P2P group is summoned or a function of making a P2P device join a legacy P2P group.

Secondly, P2P group operation explains P2P group formation and termination, connection to a P2P group, communication in a P2P group, a service for P2P client discovery, operation of a persistent P2P group and the like.

Thirdly, P2P power management is dealing with a method of managing power of a P2P device and a method of processing a signal on power saving mode timing.

Lastly, managed P2P device is dealing with a method of forming a P2P group in a single P2P device and a method of accessing an infrastructure network via a WLAN AP at the same time.

Characteristics of a P2P group are explained in the following. A P2P group is similar to a legacy infrastructure BSS (basic service set) in that a P2P GO plays a role of an AP and a P2P client plays a role of an STA. Hence, software capable of performing a role of a GO and a role of a client should be mounted on a P2P device. The P2P device is distinguished by using a P2P device address such as a MAC address. Yet, when the P2P device performs communication in a P2P group, the P2P device uses a P2P interface address. In this case, it is not necessary for the P2P device to use a single identifier (a globally unique ID) address. The P2P group includes a single identifier P2P group ID. The single identifier P2P group ID consists of a combination of an SSID (service set identifier) and a P2P device address. Wi-Fi P2P standard uses WPA2-PSK/AES for security. A life cycle of a P2P group has a temporary connection method and a persistent connection method for attempting an identical connection after prescribed time. In case of a persistent group, once a P2P group is formed, a role, a certificate, an SSID and a P2P group ID are cached. When connection is reestablished, connection of a group can be promptly established by applying an identical connection form.

In the following, Wi-Fi P2P connection method is explained. A Wi-Fi device mainly performs a connection procedure of two phases. First one corresponds to a phase that two P2P devices find out a counterpart device and a second one corresponds to a group formation phase for determining a role of a P2P GO or a role of a P2P client between discovered devices. First of all, the finding phase corresponds to a phase of connecting P2P devices with each other. In particular, the finding phase includes a search state and a listen state. The search state performs active search using a probe request frame. In this case, a range of the search is restricted for a quick search. For the quick search, such a social channel as a channel 1, 6 and 11 are used. A P2P device of the listen state maintains a reception state in a manner of selecting one channel from the 3 social channels. If the P2P device receives a probe request frame transmitted by a different P2P device of the search state, the P2P device transmits a probe response frame to the different P2P device in response to the probe request frame. P2P devices continuously repeat the search state and the listen state and may be able to arrive at a channel common to the P2P devices. The P2P devices find out a counterpart device and use a probe request frame and a probe response frame to selectively combine with the counterpart device and to discover a device type, a manufacturer, or a friendly device name. In order to check a service existing in the internal of the P2P devices and compatible between the devices, it may use the service discovery. The service discovery is used to determine whether a service provided in the internal of each device is compatible with a different device. According to the P2P standard, a specific service discovery standard is not designated. A user of a P2P device searches for a neighboring P2P device and a service provided by the P2P device and may be then able to connect with a device or a service preferred by the user.

As a second phase, a group formation phase is explained in the following. If a P2P device completes the aforementioned find phase, checking existence of a counterpart device is completed. Based on this, two P2P devices should enter a GO negotiation phase to configure a BSS. The negotiation phase is divided into two sub phases. One is a GO negotiation phase and another is a WPS (Wi-Fi protected setup) phase. In the GO negotiation phase, the two P2P devices negotiate a role of a P2P GO and a role of a P2P client with each other and an operation channel to be used in the internal of a P2P group is configured. In the WPS phase, such a usual job performed in a legacy WPS as exchanging PIN information inputted by a user using a keypad or the like, simple setup via a push button and the like is performed. In a P2P group, a P2P GO plays core role of the P2P group. The P2P GO assigns a P2P interface address, selects an operation channel of the group and transmits a beacon signal including various operation parameters of the group. In the P2P group, a beacon signal can be transmitted by the P2P GO only. A P2P device can quickly check the P2P GO using the beacon signal in a scan phase corresponding to a connection initial phase and performs a role of participating in the group. Or, the P2P GO can initiate a P2P group session by itself or may be able to initiate a session after the method mentioned earlier in the P2P finding phase is performed. Hence, since a value intended to be the P2P GO is controlled by an application or a higher layer service instead of a value fixed by a certain device, a developer can select an appropriate value, which is intended to be the P2P GO, according to a usage of each application program.

Subsequently, P2P addressing is explained in the following. A P2P device uses a P2P interface address in a manner of assigning a P2P interface address using a MAC address in a P2P group session. In this case, the P2P interface address of a P2P GO corresponds to a BSSID (BSS identifier). The BSSID practically corresponds to a MAC address of the P2P GO.

Connection release of a P2P group is explained in the following. If a P2P session is terminated, a P2P GO should inform all P2P clients of termination of a P2P group session via De-authentication. A P2P client can also inform the P2P GO of connection release. In this case, if possible, it is necessary to perform a disassociation procedure. Having received a connection release request of a client, the P2P GO can identify that connection of the P2P client is released. If the P2P GO detects a P2P client making a protocol error or performing an operation of interrupting connection of a P2P group, the P2P GO generates rejection of authentication or a denial of association. In this case, the P2P GO records a concrete failure reason on an association response and transmits the association response to the P2P client.

Figure 7:
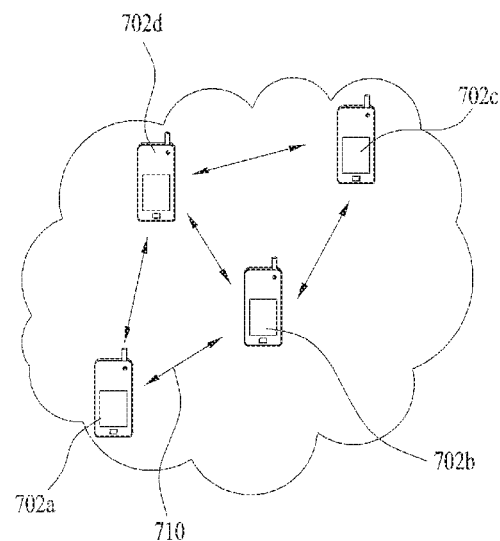
FIG. 7 is a diagram for a WFD network aspect in case that P2P is applied.

FIG. 7 is a diagram for a WFD network aspect in case that P2P is applied.

FIG. 7 shows an example of a WFD network aspect in case of applying a new P2P application (e.g., social chatting, location-based service provision, game interworking and the like). Referring to FIG. 7, a plurality of P2P devices 702a to 702d perform P2P communication 710 in a WFD network. P2P device(s) constructing the WFD network frequently change due to movement of the P2P device or the WFD network itself can be newly generated or disappeared dynamically/in a short time. Hence, characteristic of the new P2P application part is in that P2P communication can be performed and terminated dynamically/in a short time between a plurality of the P2P devices in dense network environment.

Figure 8:
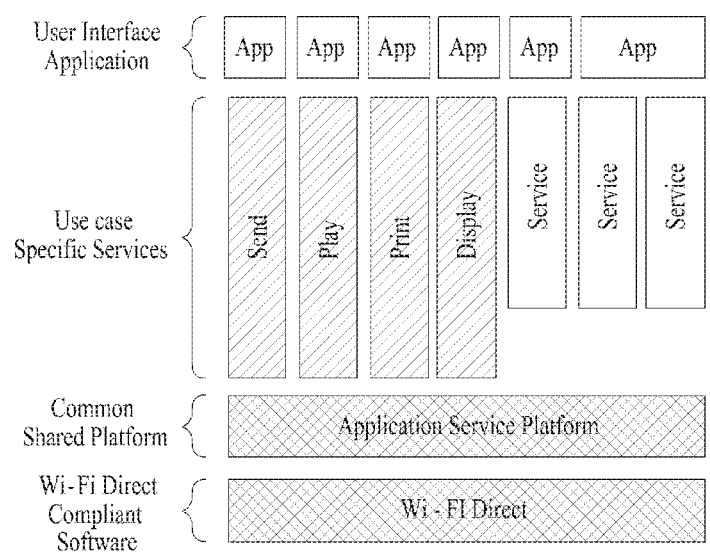
FIG. 8 is a simplified block diagram for a WFDS (Wi-Fi Direct services) device.

FIG. 8 is a simplified block diagram for a WFDS (Wi-Fi Direct services) device.

A platform for such an application service as an ASP (application service platform) is defined for a Wi-Fi Direct MAC layer and above. The ASP plays a role of session management, command processing of a service, control between ASPs and security between a higher application and a lower Wi-Fi Direct. 4 basic services including a Send service, a Play service, a Display service and a Print service defined by WFDS, a corresponding application and an UI (user interface) are supported at the top of the ASP. In this case, the Send service corresponds to a service capable of performing file transfer between two WFDS devices and an application therefor. The Play service corresponds to a streaming service capable of sharing A/V, a picture, and music based on a DLNA between two WFDS devices and an application therefor. The Print service defines a service capable of outputting a document and a picture between a device including contents such as a document, a picture and the like and a printer and an application therefor. The Display service defines a service enabling screen sharing between Miracast source of WFA and Miracast sink and an application therefor. And, an enablement service is defined for the use of an ASP common platform in case of supporting a third party application except a basic service.

Among terminologies described in the present invention, such a terminology as a service hash is formed from a service name using a first 6 octets of a service hash algorithm (e.g., SHA256 hashing) of a service name A service hash used by the present invention does not mean a specific service hash. Instead, it may be preferable to comprehend the service hash as a sufficient representation of a service name using a probe request/response discovery mechanism. As a simple example, if a service name corresponds to "org.wifi.example", 6 bytes of a forepart of a value of which the service name is hashed by the SHA256 corresponds to a hash value.

In WFDS, if a hash value is included in a probe request message and a service is matched with each other, it may be able to check whether the service is supported in a manner of responding by a probe response message including a service name. In particular, the service name corresponds to a name of a user readable service of a DNS form. A service hash value indicates upper 6 bytes among a value of 256 bytes of the service name generated by an algorithm (e.g., SHA256). As mentioned in the foregoing example, if a service name corresponds to "org.wifi.example", a service hash may correspond to a value of "4e-ce-7e-64-39-49".

Hence, a part of a value of which a service name is hashed by an algorithm is represented as a service hash (information) in the present invention. The service hash can be included in a message as information.

Method of Configuring Legacy WFDS

Figure 9:
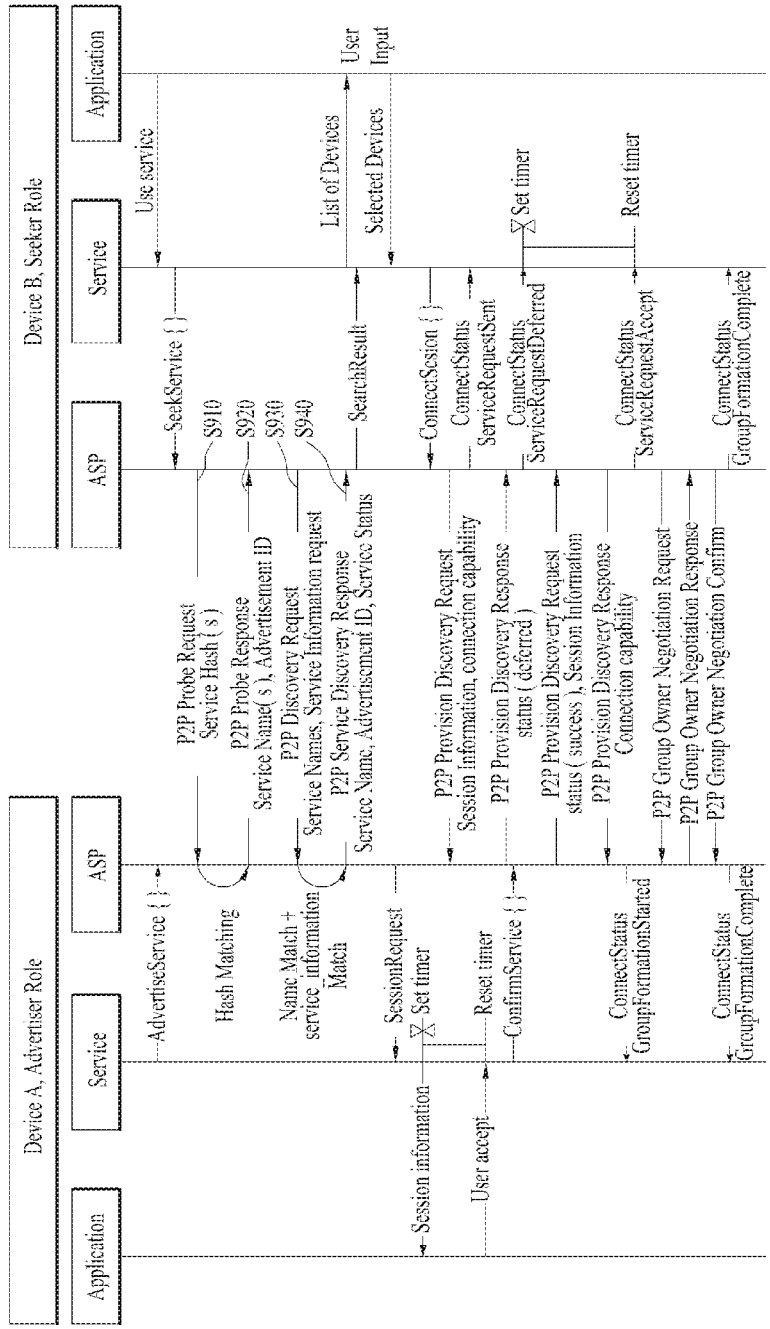
FIG. 9 is a flowchart for a process of establishing a WFDS session by discovering a device and a service between WFDS devices in a legacy WI-DS.

FIG. 9 is a flowchart for a process of establishing a WFDS session by discovering a device and a service between WFDS devices in a legacy WFDS.

For clarity, as shown in FIG. 4, assume that a device A plays a role of an advertiser advertising a WFDS capable of being provided by the device A to a seeker and a device B plays a role in seeking an advertised service. The device A corresponds to a device intending to advertise a service of the device A and a counterpart device intends to start the service in a manner of finding out the service of the device A. The device B performs a procedure of finding out a device supporting a service according to a request of a higher application or a user.

A service end of the device A advertises a WFDS capable of being provided by the service end to an application service platform (ASP) end of the device A. A service end of the device B can also advertise a WFDS capable of being provided by the service end to an ASP end of the device B. In order for the device B to use a WI-DS as a seeker, an application end of the device B indicates a service to be used to the service end and the service end indicates the ASP end to find out a target device to use the WFDS.

In order to find out the target device to use the WFDS, the ASP end of the device B transmits a P2P (peer to peer) probe request message [S910]. In this case, the P2P probe request message includes a service name, which is intended to be found out by the ASP end of the device B or is capable of being supported by the ASP end of the device B, in a service hash form in a manner of hashing the service name Having received the P2P probe request message from the seeker, if the device A supports the corresponding service, the device A transmits a P2P probe response message to the device B in response to the P2P probe request message [S920]. The P2P probe response message includes a service supported by a service name or a hash value and a corresponding advertise ID value. This procedure corresponds to a device discovery procedure indicating that the device A and the device B are WFDS devices. It is able to know whether a service is supported via the device discovery procedure.

Subsequently, it is able to know a specific service in detail via a P2P service discovery procedure, optionally. The device B, which has found a device capable of performing a WFDS with the device B, transmits a P2P service discovery request message to the device [S930]. Having received the P2P service discovery request message from the device B, the ASP end of the device A transmits a P2P service discovery response message to the device B in a manner of matching the service advertised by the service end of the device A with a P2P service name and a P2P service information received from the device B with each other [S940]. In this case, a GAS protocol defined by IEEE 802.11u is used. As mentioned in the foregoing description, when a request for a service search is completed, the device B can inform an application and a user of a search result. At this point, a group of Wi-Fi Direct is not formed yet. If a user selects a service and the selected service performs a connect session, P2P group formation is performed.

In the following, a method of configuring an ASP operating based on at least one selected from the group consisting of WFA, WFDS, Wi-Fi Direct, NAN (Neighbor Awareness Networking), NFC (Near Field Communication), and BLE (Bluetooth Low Energy) is disclosed as an embodiment of the present invention. In this case, the WFDS and the like may correspond to an interface. In particular, the interface may correspond to a method of supporting an operation of a terminal. In the following, a method for an ASP to interwork with a device/service discovery based on the interfaces is explained in detail.

In this case, for example, among the aforementioned interfaces, the BLE may correspond to a Bluetooth transmission/reception scheme in a form of using a frequency of 2.4 GHz and reducing power consumption. In particular, in order to quickly transmit and receive data of extremely small capacity, it may use the BLE to transmit data while reducing power consumption.

And, for example, the NAN (neighbor awareness networking) network may correspond to NAN terminals using a set of the same NAN parameters (e.g., a time period between continuous discovery windows, a period of a discovery window, a beacon interval, a NAN channel, etc.).

The NAN terminals can configure a NAN cluster. In this case, the NAN cluster uses a set of the same NAN parameters and may correspond to a set of NAN terminals synchronized with the same window schedule. A NAN terminal belonging to the NAN cluster can directly transmit a multicast/unicast NAN service discovery frame to a different NAN terminal within a range of a discovery window.

And, for example, the NFC may operate on a relatively low frequency band such as 13.56 MHz. In this case, if two P2P devices support the NFC, it may optionally use an NFC channel A seeker P2P device can discover a P2P device using the NFC channel. When an NFC device is discovered, it may indicate that two P2P devices agree on a common channel for forming a group and share provisioning information such as a password of a device.

A method of interworking via an ASP for the aforementioned interfaces is explained in detail in the following. In this case, although the abovementioned configurations are proposed as an interface capable of being interlocked with the ASP, this is an example only. It may support a different interface as well, by which the present invention may be non-limited.

Figure 10:
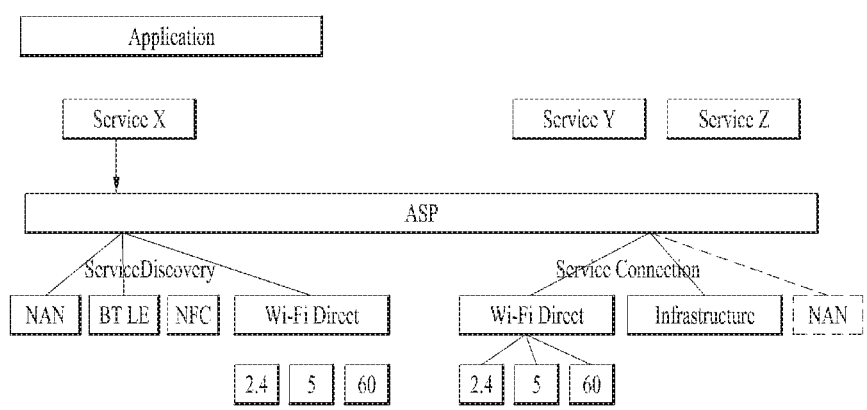
FIG. 10 is a diagram for an application service platform (ASP) supporting a plurality of interfaces.

FIG. 10 is a diagram for a service application platform (ASP) supporting a plurality of interfaces.

As mentioned in the foregoing description, a service end of an advertiser terminal corresponding to a terminal supporting WFDS advertises a service capable of being provided by the service end and a service end of a seeker terminal corresponding to a different terminal supporting the WFDS can indicate an ASP end to search for a target device for which the service is to be used.

In particular, it may be able to support the WFDS between terminals via the ASP.

In this case, referring to FIG. 10, the ASP can support a plurality of interfaces. In this case, for example, the ASP can support a plurality of interfaces for performing service discovery. And, the ASP can support a plurality of interfaces for performing service connection.

In this case, for example, a plurality of the interfaces for performing the service discovery may correspond to at least one selected from the group consisting of Wi-Fi Direct, NAN (Neighbor Awareness Networking), NFC (Near Field Communication), BLE (Bluetooth Low Energy), and WLAN Infrastructure.

And, a plurality of the interfaces for performing the service connection may correspond to at least one selected from the group consisting of Wi-Pi Direct, P2P, and Infrastructure. And, for example, the ASP can support a plurality of frequency bands. In this case, for example, a plurality of the frequency bands may correspond to 2.4 GHz, 5 GHz, 60 GHz, and the like. And, for example, the ASP can support information on a frequency band less than 1 GHz. In particular, the ASP can support a plurality of frequency band and is not restricted to a specific frequency band.

Referring to FIG. 10, a first UE can perform device discovery or service discovery on a first service using the ASP. Subsequently, if searching for the device discovery or the service discovery is completed, it may perform service connection based on a search result. In this case, for example, an interface used for performing the service discovery may be different from an interface used for performing the service connection. The interfaces can be selected from among a plurality of interfaces.

In this case, the ASP may use information or a parameter for supporting a plurality of the interfaces.

Regarding the ASP, for example, a service end of a terminal can obtain information on a service discovery method capable of supporting the first service and a connection method from the ASP. In this case, the first service may correspond to a service provided by the terminal and is not restricted to a specific service.

The service end of the terminal can call AdvertiseService( ) or SeekService( ) method to the ASP based on the information obtained from the ASP. In particular, similar to a legacy ASP operation, the terminal can use the ASP as an advertiser or a seeker to perform service discovery on the first service. After the service discovery is performed on the first service, the terminal can perform service connection based on a result of the service discovery.

In this case, the service connection may correspond to a P2P or a WLAN infrastructure. In this case, for example, since both the service connections support a plurality of frequency bands, the service connection can be performed on the basis of a preferred band.

In this case, for one example, information on a service discovery method and connectivity method may be represented as Table 1.

TABLE 1

| Connectivity methods | P2P | Multiband information | 2.4, 5, 60 GHz | |
|---|---|---|---|---|
| | Infrastructure information | BSSID | | |
| | | Multiband information | 2.4, 5, 60 GHz | Channel Index per band |
| | NAN | NAN Data Path | | |
| Service Discovery methods | | NAN | | |
| | | BTLE | | |
| | | NFC | | |
| | | Infrastructure | | |
| | P2P | Multiband information | 2.4, 5, 60 GHz | |

Figure 11:
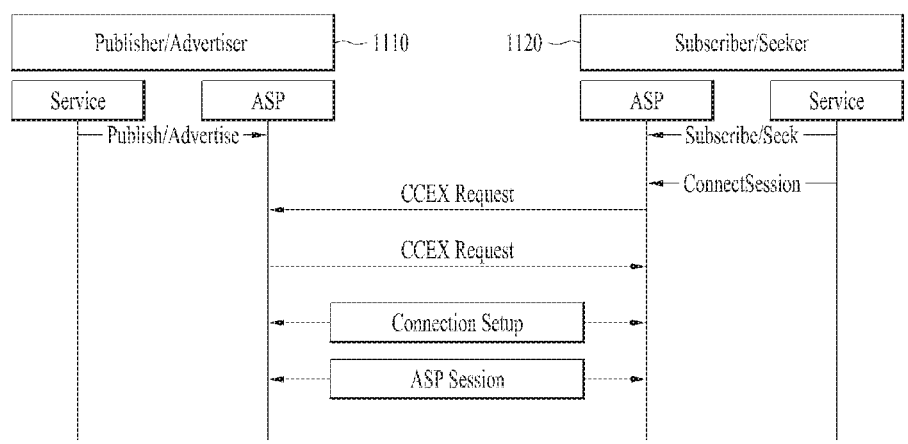
FIG. 11 is a diagram for a method for performing connection capability exchange in an advertiser UE and a seeker UE.

FIG. 11 is a diagram for a method for performing connection capability exchange in an advertiser UE and a seeker UE.

As described above, the UE may perform service discovery and service connection on the basis of the ASP that supports a plurality of interfaces. At this time, connection capability exchange (CCEX or CCS, hereinafter, referred to as CCEX) may be performed based on the ASP. In more detail, referring to FIG. 11, a first UE 1110 may perform connection capability exchange with a second UE 1120 on the basis of the ASP. At this time, as an example, the first UE 1110 and the second UE 1120 may be UEs that perform service discover on the basis of the ASP. At this time, the service discovery may be performed based on any one of the plurality of interfaces. As an example, the first UE 1110 may be an advertiser UE, and the second UE 1120 may be a seeker UE. Also, as an example, the first UE 1110 may be a Publisher UE, and the second UE 1120 may be a Subscriber UE. That is, the first UE 1110 and the second UE 1120 may be the UEs intended to form ASP session for a specific service by performing service discovery using any one of the plurality of interfaces. At this time, the first UE 1110 and the second UE 1120 may perform CCEX. The first UE 1110 and the second UE 1120 may exchange capability information for service connection through CCEX. That is, the first UE 1110 and the second UE 1120 may identify an interface capable of connecting service. As a result, the first UE 1110 and the second UE 1120 may quickly establish connection on the basis of the identified information and form ASP session. In more detail, the first UE 1110 and the second UE 1120 may reuse the legacy connection topology or determine whether to establish new connection, and as a result, may establish quick connection.

At this time, as an example, CCEX may be started when a service/application end of the second UE 1120 pages a connection session ConnectSession method. In this case, the second UE 1120 may transmit a CCEX request to the first UE 1110 on the basis of the paged method. Afterwards, the first UE 1110 may transmit CCEX response to the second UE 1120. That is, the first UE 1110 and the second UE 1120 may perform CCEX procedure by exchanging CCEX message. Then, the second UE 1120 may perform connection establishment by using any one of the available interfaces on the basis of the CCEX response. Afterwards, the first UE 1110 and the second UE 1120 may perform ASP session connection.

That is, CCEX may be an operation performed by the first UE 1110 and the second UE 1120 to identify a potential connection method, and is not limited to the aforementioned embodiment.

Figure 12:
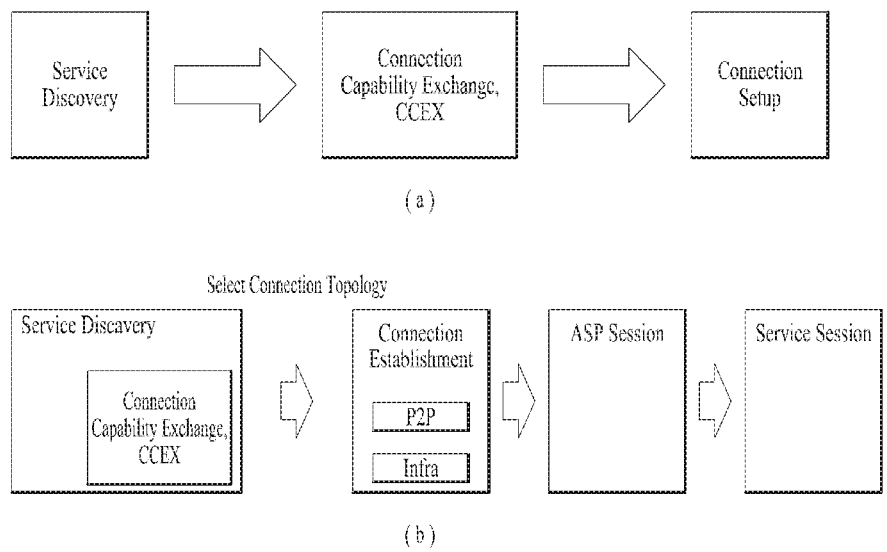
FIG. 12 is a diagram for a method for performing connection capability exchange.

FIG. 12 is a diagram for a method for performing connection capability exchange.

Referring to FIG. 12(a), a UE may perform service discovery by using any one of a plurality of interfaces on the basis of ASP. At this time, the UE may complete a search for a UE that supports a specific service, during a service discovery procedure. As an example, the UE may perform CCEX after service discovery is completed. That is, the UE may exchange information as to possibility of connection setup for a specific service with a specific UE after completing a search for the specific service and the specific UE. At this time, as an example, the UE may perform CCEX by using any one of a plurality of interfaces supported by the ASP. For example, the UE may perform CCEX by using any one of Wi-Fi Direct, NAN, NFC, BLE and WLAN infrastructure. That is, the UE may acquire information on CCEX by exchanging CCEX request and CCEX response using any one of the aforementioned interfaces. Afterwards, the UE may perform connection setup on the basis of the performed CCEX. For example, information on connection capability may be included in the CCEX. Connection capability may include at least any one of information on the existing P2P group formation, the existing P2P connection and the existing WLAN infrastructure information. At this time, the UE may perform connection setup by using the legacy P2P connection or the legacy WLAN infrastructure connection, and may perform ASP session connection. Also, as an example, connection capability may include information on a connection method which may newly be formed. The UE may newly establish connection by using the information on the connection method, and may perform ASP session connection.

That is, the UE may perform CCEX after a specific service for a specific UE is determined by completing service discovery. At this time, as described above, the UE needs to exchange CCEX request and CCEX response with a target UE to perform the CCEX procedure. In this case, the CCEX request and the CCEX response may mean messages including CCEX information, and the CCEX information will be described later.

For example, the CCEX information is one kind of attribute information, and may be included in a message (or frame) exchanged during service discovery. That is, CCEX may be performed through the message exchanged during service discovery without a procedure of exchanging a separate message including information on CCEX.

In more detail, referring to FIG. 12(b), CCEX may be performed during service discovery. That is, CCEX may be performed together with service discovery when service discovery is performed.

For example, the UE may perform service discovery by using any one of the plurality of interfaces. At this time, the UE may receive a P2P Probe response frame after transmitting a P2P probe request frame. The UE may search for another UE that supports a service through the P2P probe request frame and the P2P probe response frame. For example, the P2P probe request frame and the P2P probe response frame may include CCEX information attribute. At this time, the CCEX information attribute may be listed in Table 2 below. The CCEX information attribute may include an attribute ID field, a length field, and a CCX information (or CCEX information) field.

The attribute ID field is a field indicating a P2P attribute type as listed in Table 3 below. The P2P attribute type may be defined to identify information which is included. In respect of the P2P attribute type, the CCEX information attribute may be used by being defined as any one of reserved bits. That is, the attribute ID may be set to a value corresponding to the CCEX information attribute.

Also, the CCEX information field may include information as to support of an interface that performs service connection. At this time, the CCEX information field may include a bit for indicating whether P2P connection is supported. For example, if bit 0 is set to 1, P2P connection may be supported. Also, if bit 0 is set to 0, P2P connection may not be supported.

Also, as an example, bit 1 may be a bit for indicating whether WLAN infrastructure connection is supported. At this time, if bit 1 is set to 1, WLAN infrastructure connection may be supported. Also, if bit 1 is set to 0, WLAN infrastructure connection may not be supported.

As another example, the reserved bits 2 to 7 may be used to indicate whether another connection method is supported. For example, any one of the reserved bits may indicate whether a NAN data path is supported, and is not limited to the aforementioned embodiment.

That is, if the UE performs service discovery on the basis of the Wi-Fi Direct interface, the UE may include the P2P probe request frame and the P2P probe response frame in the CCEX information attribute for exchanging connection capability information in the P2P probe request frame and the P2P probe response frame. As a result, the UE may identify the interface, which may be used for service connection, without performing additional CCEX procedure.

For another example, the CCEX information attribute field may be included in a P2P service discovery request frame and a P2P service discovery response frame. That is, the UE may exchange CCEX information through the P2P service discovery request frame and the P2P service discovery response frame for performing a search for a service after searching for a specific UE on the basis of the P2P service discovery request frame and the P2P service discovery response frame.

At this time, for still another example, the CCEX information attribute may be included in a provision discovery request frame and a provision discovery response frame and ten exchanged between the UEs.

However, referring to FIG. 9, if the UEs are operated based on the Wi-Fi Direct interface, the provision discovery request frame and the provision discovery response frame may be the frames exchanged after the connection session ConnectSession method is paged. That is, the provision discovery request frame and the provision discovery response frame may be procedures performed after service discovery is completed through the Wi-Fi Direct interface. Therefore, if the CCEX information is included in the provision discovery request frame and the provision discovery response frame, it may be regarded that CCEX is not performed within the service discovery procedure. Also, as an example, if the service connection method is supported by the WLAN infrastructure only on the basis of the CCEX information attribute, since the exchange method of the provision discovery request frame and the provision discovery response frame is based on the Wi-Fi Direct, the UE should be connected to the WLAN infrastructure by ending Wi-Fi Direct connection, whereby an unnecessary procedure may be performed.

Therefore, based on the aforementioned description, the UE may exchange the P2P probe request frame and the P2P probe response frame by including the CCEX information attribute in the P2P probe request frame and the P2P probe response frame as the service discovery procedure, thereby acquiring information on connection capability during the service discovery procedure. As a result, the UE may omit the unnecessary procedure.

TABLE 2

| Field Name | Size (octets) | Value | Description |
|---|---|---|---|
| Attribute ID | 1 | 29 | Identifying the type of P2P attribute. The specific value is defined in Table 3(P2P Attribute ID definitions). |
| Length | 2 | 1 | Length of the following fields in the attribute. |
| CCX Information | 1 | variable | Bit 0: P2P Connection. Bit 0 set to 1 indicates that P2P connection is supported. Otherwise, not supported. Bit 1: Infrastructure Connection. Bit 1 set to 1 indicates that Infrastructure connection is supported. Otherwise, not supported. Bit 2-7: Reserved. |

TABLE 3

| Attribute ID | Notes |
|---|---|
| 21 | Service Hash |
| 22 | Session Information Data Info |
| 23 | Connection Capability Info |
| 24 | Advertisement ID Info |
| 25 | Advertised Service Info |
| 26 | Session ID Info |
| 27 | Feature Capability |
| 28 | Persistent Group Info |
| 29 | CCX Information |
| 30 | Infrastructure Connection Info |
| 31 | Service Type Hash |
| 32 | ASP Advertised Service Info |
| 33-220 | Reserved |

Also, as an example, if the UE is already associated with an access point (AP) through the WLAN infrastructure, Infrastructure Connection Info Attribute may be included in the P2P probe request frame and the P2P probe connection frame. At this time, as an example, the infrastructure connection information attribute may be as listed in Table 4 below. For example, the infrastructure connection information attribute may include Attribute ID, Length, BSSID, Infrastructure Interface Address, and IP address field. At this time, for example, Attribute ID may be set to any one value of the reserved bits in Table 3.

Also, BSSID may be ID information on the associated AP. Also, BSSID may include infrastructure address information and IP address information. At this time, for example, if infrastructure connection information attribute is included in the P2P probe request frame and the P2P probe response frame, the advertiser UE may compare BSSID of the infrastructure connection information attribute included in the received P2P probe request frame with its BSSID. At this time, if BSSID of the infrastructure connection information attribute is matched with BSSID of the advertiser UE, the advertiser UE may determine that it may perform WLAN infrastructure connection with the seeker UE. At this time, the advertiser UE may select WLAN INFRASTRUCTURE as a service connection method. That is, infrastructure connection bit of CCEX information attribute of the probe response frame may be set to 1. Therefore, the seeker UE may also determine that it may perform service connection with the advertiser UE through WLAN INFRASTRUCTURE. Afterwards, the seeker UE and the advertiser UE may perform service connection by using WLAN INFRASTRUCTURE.

TABLE 4

| Field Name | Size (octets) | Value | Description |
| --- | --- | --- | --- |
| Attribute ID | 1 | 30 | Identifying the type of P2P attribute. The specific value is defined in Table 3 (P2P Attribute ID definitions). |
| Length | 2 | 16 or 28 | Length of the following fields in the attribute. |
| BSSID | 6 | variable | BSSID of the associated AP |
| Infrastructure Interface Address | 6 | variable | The MAC address for infrastructures connection. |
| IP Address | 4 or 16 | variable | Identifying IPv4 address or IPv6 address. If it is IPv4 address, the length of the field is 4 octets. If it is IPv6 address, the length of the field is 16 octets. |

Also, as an example, the infrastructure connection information attribute may further include channel information as listed in Table 5 below. At this time, the channel information may be channel information on the associated AP.

TABLE 5

| Field Name | Size (octets) | Value | Description |
| --- | --- | --- | --- |
| Attribute ID | 1 | 30 | Identifying the type of P2P attribute. The specific value is defined in Table 3 (P2P Attribute ID definitions). |
| Length | 2 | 16 or 28 | Length of the following fields in the attribute. |
| BSSID | 6 | variable | BSSID of the associated AP |
| Channel Info | 5 | variable | Operating channel information of the association AP. This filed consists with Country String(3 bytes), Operating Class (1 byte) and Channel Number (1 byte) |
| Infrastructure Interface Address | 6 | variable | The MAC address for infrastructures connection. |
| IP Address | 4 or 16 | variable | Identifying IPv4 address or IPv6 address. If it is IPv4 address, the length of the field is 4 octets. If it is IPv6 address, the length of the field is 16 octets. |

Figure 13:
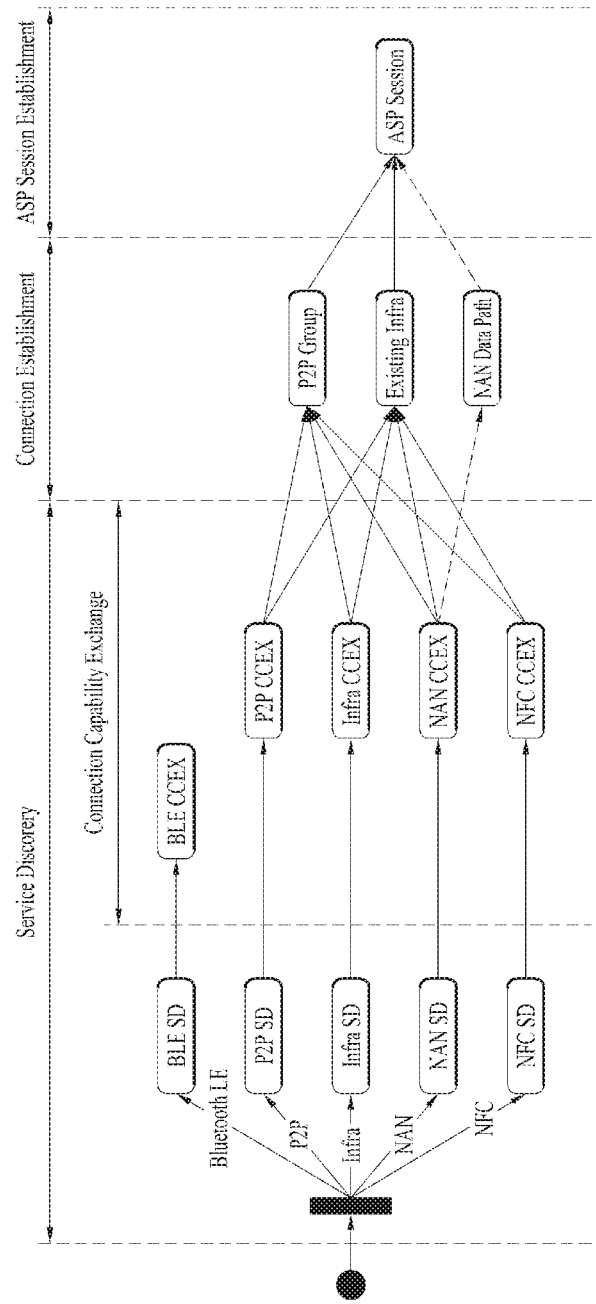
FIG. 13 is a diagram for a method for establishing an ASP session by performing connection capability in service discovery.

FIG. 13 is a diagram for a method for establishing an ASP session by performing connection capability in service discovery.

The UE may form ASP session by establishing connection with a UE, which supports a service, after performing service discovery for a specific service. At this time, as described above, the UE may be a UE operated based on ASP that supports a plurality of interfaces. At this time, the UE may perform service discovery by using any one of the plurality of interfaces. If the UE performs service discovery, the UE may perform a service discovery procedure by exchanging a message (or frame) with another UE. At this time, as an example, the UE may exchange a frame for CCEX after exchanging a frame for service discovery within the service discover procedure. Also, as an example, the UE may exchange the frame by including information on CCEX in the frame for service discovery during the service discovery procedure. That is, CCEX may be completed during the service discovery procedure. At this time, the UE may identify an interface capable of performing service connection for a specific service if service discovery is completed. Afterwards, the UE may perform connection establishment on the basis of the interface capable of performing service connection. The UE may form ASP session after connection establishment and perform an operation for the specific service with another UE.

Figure 14:
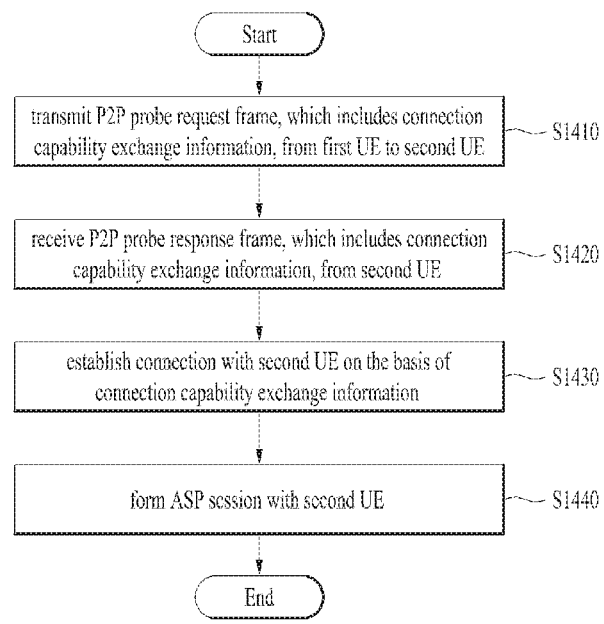
FIG. 14 is a diagram for a flow chart of a method for performing connection capability exchange in a UE in accordance with one embodiment of the present specification.

FIG. 14 is a diagram for a flow chart of a method for performing connection capability exchange in a UE in accordance with one embodiment of the present specification.

A first UE may transmit a P2P probe request frame, which includes connection capability exchange information, to a second UE (S1410). Next, the first UE may receive a P2P probe response frame, which includes connection capability exchange information, from the second UE (S1420).

At this time, as described with reference to FIGS. 10 to 13, the first UE and the second UE may be the UEs operated based on the ASP that supports the plurality of interfaces. At this time, if the first UE performs service discovery on the basis of a Wi-Fi Direct interface of the plurality of interfaces, the first UE may transmit the P2P probe request frame to the second UE. At this time, the second UE may transmit the P2P probe response frame to the first UE in response to the P2P probe request frame. Connection capability exchange information (CCEX information) may be included in the P2P probe request frame and the P2P probe response frame. That is, the first UE and the second UE may perform CCEX together in the step of performing service discovery. Therefore, the first UE and the second UE may previously acquire information on an interface capable of performing connection during the service discovery, whereby an unnecessary procedure may be omitted.

Next, the first UE may perform connection establishment with the second UE on the basis of connection capability exchange information (S1430). Then, the first UE may form ASP session with the second UE (S1440). At this time, as described with reference to FIGS. 10 to 13, the connection capability exchange information may include information as to whether each interface can be supported. For example, the connection capability exchange information may include a bit indicating whether the Wi-Fi Direct interface is supported. Also, the connection capability exchange information may include a bit indicating whether the WLAN infrastructure is supported. Also, as an example, the first UE and the second UE may reuse the legacy connection on the basis of the connection capability exchange information or form new connection, as described above.

Figure 15:
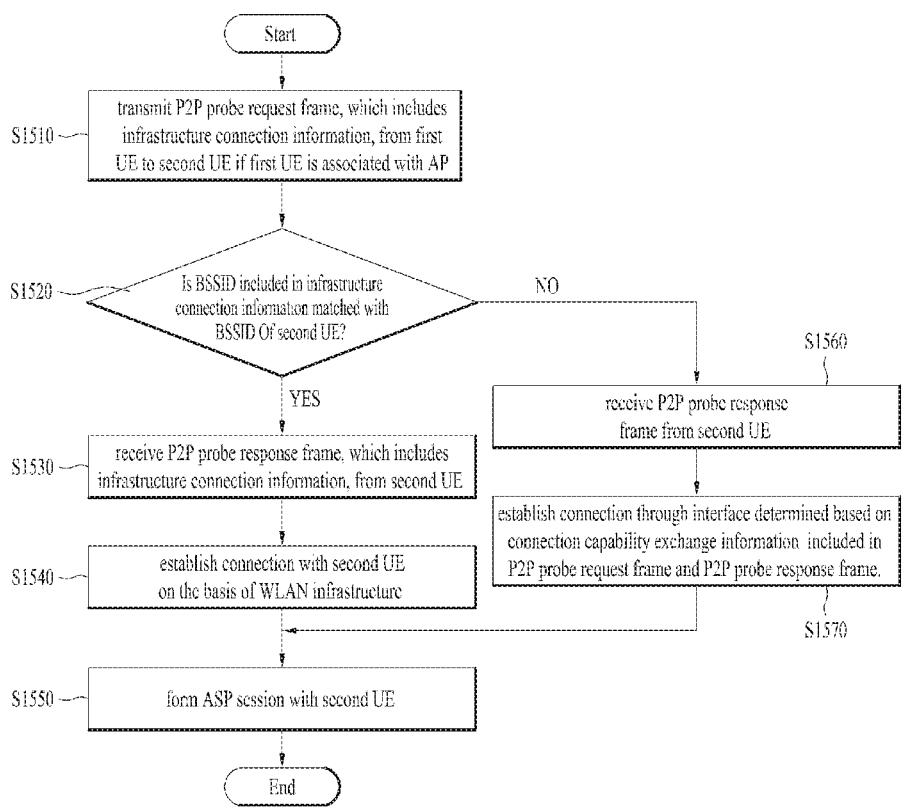
FIG. 15 is a diagram for a flow chart of a method for performing connection establishment in a UE on the basis of an access point in accordance with one embodiment of the present specification.

FIG. 15 is a diagram for a flow chart of a method for performing connection establishment in a UE on the basis of an access point in accordance with one embodiment of the present specification.

If a first UE is associated with the AP, the first UE may transmit a P2P probe request frame, which includes infrastructure connection information, to a second UE (S1510). At this time, as described with reference to FIGS. 10 to 13, if the first UE is associated with the AP, the first UE may provide information indicating that the first UE is associated with the AP, by including infrastructure connection information in the P2P probe request frame.

Next, if BSSID of the infrastructure connection information included in the P2P probe request frame is matched with BSSID of an AP with which the second UE is associated (S1520), the first UE may receive the P2P probe response frame, which includes infrastructure connection information, from the second UE (S1530). Next, the first UE and the second UE may establish connection by using WLAN infrastructure (S1540). At this time, as described with reference to FIGS. 10 to 13, if the first UE and the second UE are associated with the same AP, connection through infrastructure connection may be performed based on the AP to reduce an unnecessary procedure. Therefore, if the first UE is associated with the AP, the first UE may identify whether WLAN infrastructure may be used by including infrastructure connection information in the P2P probe request frame. Afterwards, the first UE may form ASP session with the second UE (S1550).

At this time, if BSSID of the infrastructure connection information included in the P2P probe request frame is not matched with BSSID of the AP with which the second UE is associated (S1520), the first UE may receive the P2P probe response frame from the second UE (S1560). Next, the first UE and the second UE may establish connection to interface determined based on connection capability exchange information included in the P2P probe request frame and the P2P probe response frame (S1570). At this time, as described with reference to FIGS. 10 to 13, the connection capability exchange information may be included in the P2P probe request frame and the P2P probe response frame. That is, if the first UE and the second UE are not associated with the same AP, connection establishment may be performed based on the connection capability exchange information as described with reference to FIG. 14. Next, the first UE and the second UE may form ASP session (S1550).

Figure 16:
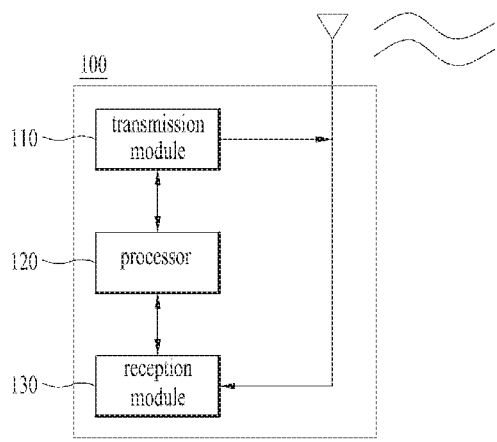
FIG. 16 is a block diagram for a UE according to one embodiment of the present specification.

FIG. 16 is a block diagram of a user equipment device according to an embodiment of the present specification.

A user equipment (UE) device may include a P2P UE. For example, the UE device may include a P2P UE supportive of ASP capable of using a plurality of interfaces. The UE device 100 may include a transmitting module 110 transmitting a wireless signal, a receiving module 130 receiving a wireless signal, and a processor 120 controlling the transmitting module 110 and the receiving module 130. The UE 100 may communicate with an external device using the transmitting module 110 and the receiving module 130. Here, the external device may include a different UE device. For example, the external device may include a different UE device connected through P2P or an AP or non-AP device connected through WLAN infrastructure. For example, the external device may include a base station. Namely, the external device may include a device capable of communicating with the UE device 100, which is non-limited by the aforementioned embodiment. The UE device 100 may transmit and receive digital data such as contents and the like using the transmitting module 110 and the receiving module 130.

Moreover, for example, the UE device can play a role as a seeker UE. The UE device can play a role as an advertiser UE, which is described above. Here, according to one embodiment of the present specification, in case that the UE device plays a role as a seeker UE, the processor 120 of the UE device 100 can send a first frame for discovery to an advertiser UE using the transmitting module 110. Here, for example, the first frame may include a probe request frame. The processor 120 receives a second frame in response to the first frame from the advertiser UE using the receiving module 130 and is able to discover a matched P2P UE based on the received second frame. Here, for example, the second frame may include a probe response frame. For example, the seeker UE may send a first frame by operating in search mode only without a listen mode and a scan mode. Namely, the UE device may operate in search mode only in consideration of a seeker UE role. The advertiser UE may send a second frame by operating in listen mode only. Namely, the UE device may operate in listen mode only in consideration of an advertiser UE role. The seeker UE and the advertiser UE may perform discovery on a first channel only. Here, the first channel is a single social channel and the seeker UE and the advertiser UE can perform discovery through the first channel only. Through this, an unnecessary procedure is reduced and a discovery time can be shortened.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein. Those skilled in the art will appreciate that the present invention may be carried out in other specific ways than those set forth herein without departing from the spirit and essential characteristics of the present invention. The above embodiments are therefore to be construed in all aspects as illustrative and not restrictive.

In the present specification, both an apparatus invention and a method invention are described and descriptions of both inventions are applicable supplementarily

INDUSTRIAL APPLICABILITY

Although a method for a user equipment to perform discovery in a wireless communication system is described centering on an example of applying to a P2P system, such a method is applicable to various wireless communication systems as well as to the P2P system.

The invention claimed is:

1. A method for establishing an application service platform (ASP) session by a first user equipment (UE) in a wireless communication system, the method comprising:
    transmitting, to a second UE, a peer-to-peer (P2P) probe request frame comprising connection capability exchange (CCEX) information comprising information on indicating whether a connection topology is supported and information related to an infrastructure connection being supported, wherein the connection topology comprises a P2P connection;
    in response to the P2P probe request frame, receiving, from the second UE, a P2P probe response frame comprising information on a selected connection interface,
    wherein the selected connection interface is one of: the connection topology or the infrastructure connection;
    establishing, with the second UE, the ASP session, over the selected connection interface based on the information on the selected connection interface; and wherein:
    the CCEX information comprises an information field with a bit sequence;
    a most significant bit (MSB), included in the bit sequence, indicates whether the P2P connection is supported; and
    a bit, included in the bit sequence and next to the MSB, indicates whether the infrastructure connection is supported.

2. The method of claim 1, further comprising:
    performing service discovery with the second UE based on an ASP supporting a plurality of service discovery interfaces and a plurality of service connection interfaces.

3. The method of claim 2, wherein each of the plurality of service discovery interfaces includes one of Wi-Fi Direct, neighbor awareness networking (NAN), near field communication (NFC), bluetooth low energy (BLE), or wireless local area network (WLAN) infrastructure.

4. The method of claim 3, wherein the service discovery is completed by transmitting the P2P probe request frame to the second UE and receiving the P2P probe response frame from the second UE when the service discovery is performed based on the Wi-Fi Direct among the plurality of service discovery interfaces.

5. The method of claim 2, wherein each of the plurality of service connection interfaces comprises one of Wi-Fi Direct, neighbor awareness networking (NAN), or wireless local area network (WLAN) infrastructure.

6. The method of claim 5, wherein the P2P probe request frame further comprises information on whether the NAN is supported.

7. The method of claim 1, wherein the P2P probe request frame and the P2P probe response frame respectively comprise infrastructure connection information based on the first UE being associated with an access point (AP).

8. The method of claim 7, further comprising:
    performing connection establishment with the second UE based on wireless local area network (WLAN) infrastructure based on a basic service set identifier (BSSID) of the AP being matched with a BSSID of the second UE,
    wherein the infrastructure connection information comprises information on the BSSID of the AP.

9. A first user equipment (UE) for performing connection capability exchange (CCEX) in a wireless communication system, the first UE comprising:
    a memory; and
    at least one processor coupled with the memory and configured to: transmit, to a second UE, a peer-to-peer (P2P) probe request frame comprising
    connection capability exchange (CCEX) information comprising information on indicating whether a connection topology is supported and information related to an infrastructure connection being supported, wherein the connection topology comprises a P2P connection;
    in response to the P2P probe request frame, receive, from the second UE, a P2P probe response frame comprising information on a selected connection interface;
    wherein the selected connection interface is one of: the connection topology or the infrastructure connection;
    establish, with the second UE, the ASP session over the selected connection interface based on the information on the selected connection interface; and wherein:
    the CCEX information comprises an information field with a bit sequence;
    a most significant bit (MSB), included in the bit sequence, indicates whether the P2P connection is supported; and
    a bit, included in the bit sequence and next to the MSB, indicates whether the infrastructure connection is supported.

10. The method of claim 1, wherein the bit sequence consists of 8 bits.

11. The first UE of claim 9, wherein the P2P probe request frame and the P2P probe response frame respectively comprise infrastructure connection information when the first UE is associated with an access point (AP).

12. The first UE of claim 11, wherein the at least one processor is further configured to perform service discovery with the second UE based on an ASP supporting a plurality of service discovery interfaces and a plurality of service connection interfaces.

13. The first UE of claim 12, wherein each of the plurality of service discovery interfaces comprises one of Wi-Fi Direct, neighbor awareness networking (NAN), near field communication (NFC), bluetooth low energy (BLE), or wireless local area network (WLAN) infrastructure.

14. The first UE of claim 13, wherein the service discovery is completed by transmitting the P2P probe request frame to the second UE and receiving the P2P probe response frame from the second UE when the service discovery is performed based on the Wi-Fi Direct among the plurality of service discovery interfaces.

15. The first UE of claim 12, wherein each of the plurality of service connection interfaces comprises one of Wi-Fi Direct, neighbor awareness networking (NAN), or wireless local area network (WLAN) infrastructure.

16. The first UE of claim 15, wherein the P2P probe request frame further comprises information on whether the NAN is supported.

17. The first UE of claim 11, wherein the bit sequence consists of 8 bits.

* * * * *